United States Patent [19]

Campbell

[11] Patent Number: 4,889,390
[45] Date of Patent: Dec. 26, 1989

[54] TIPPING TRAYS

[75] Inventor: Lyall J. Campbell, Milford, New Zealand

[73] Assignee: Camryde Industries Limited, Auckland, New Zealand

[21] Appl. No.: 137,431

[22] Filed: Dec. 22, 1987

[30] Foreign Application Priority Data

Dec. 23, 1986 [NZ] New Zealand .................. 218775

[51] Int. Cl.$^4$ .................................................. B60P 1/12
[52] U.S. Cl. ...................................... 298/5; 298/20 R
[58] Field of Search ................. 280/400; 298/20 R, 5

[56] References Cited

U.S. PATENT DOCUMENTS 2,491,417 12/1949 Pflantz et al. ............................ 298/5
4,639,043 1/1987 Morissette ........................ 298/20 R

FOREIGN PATENT DOCUMENTS 76111 7/1953 Denmark ........................... 298/20 R
509566 11/1920 France .............................. 298/20 R Primary Examiner—John A. Pekar
Attorney, Agent, or Firm—Ladas & Parry

[57] ABSTRACT

This invention relates to a towable trailer having a tipping tray. The tipping tray incorporates an axle and wheels, and is mounted to the trailer's chassis via a pivot. The chassis incorporates a guide slot which accommodates the tray's pivot. A cam arrangement is provided to control the rate and angle at which the tray is tipped. To tip the tray, the trailer is reversed, and the towing vehicle suddenly braked. The tray continues to move in the reverse direction by virtue of its inertia. The pivot of the tray slides rearward within the guide slot, while the cam on the tray bears against a follower on the chassis to tip the tray.

10 Claims, 1 Drawing Sheet

TIPPING TRAYS

FIELD OF THE INVENTION

This invention relates to tippable trays, for use in vehicles and carriages such as articulated trailers and the like.

DESCRIPTION OF THE PRIOR ART

In the past, tippable trays have typically had a winch mechanism or other means, such as a hydraulic lift, for operating the tray between their carriage and discharge positions.

However, such mechanisms can be expensive, complicated, prone to failure, and, particularly in the case of the simpler winch mechanisms, be laborious and time consuming to operate.

It is an object of this invention to provide a means of going some way to overcome at least some of the foregoing difficulties.

SUMMARY OF THE INVENTION

In a first aspect of this invention, there is provided a vehicle comprising a chassis incorporating a towbar at a front end, a tipping tray secured to at least one axial member supporting ground wheels, articulation means comprising a pivot with a transverse axis secured to one of the tray and chassis, guiding means secured to the other of the tray and chassis and adapted to slidably accommodate, for longitudinal displacement of the pivot, camming means longitudinally spaced apart from the articulation means and comprising at least one cam and cam-follower, one secured to the tray and the other to the chassis and adapted to co-operate to alter the angular disposition of the tray between a carriage position and a discharge position when the pivot is moved longitudinally of the guiding means in so doing the camming action articulating the tray about the axis of the pivot.

DESCRIPTION OF SPECIFIC EMBODIMENTS

Figure 1:
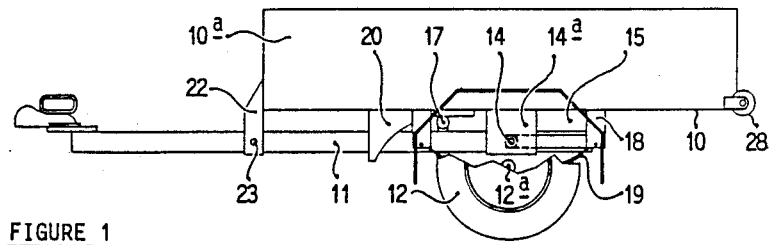
FIGS. 1 and 2 are partially sectioned side views of the tipping tray, as applied to a trailer, in a carriage and a discharge position respectively.
Figure 2:
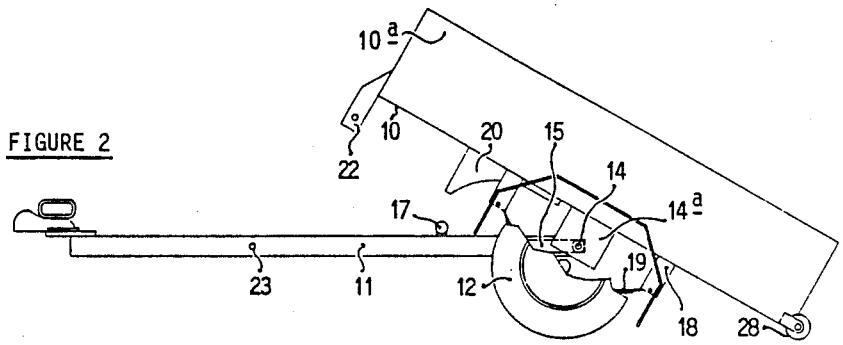
Figure 3:
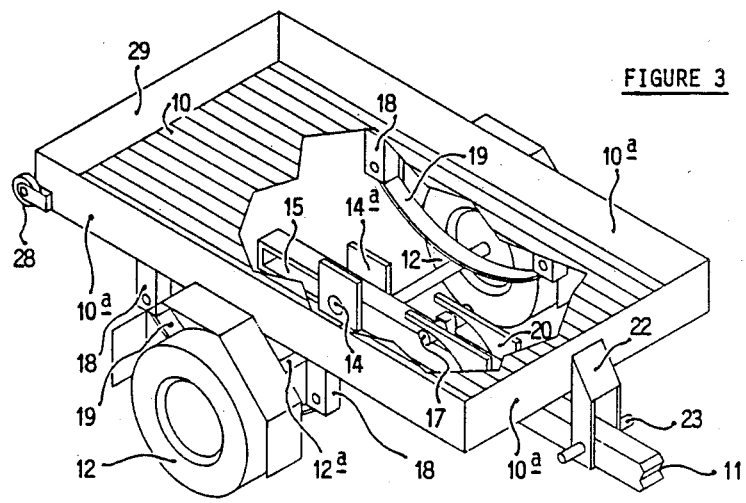
FIG. 3 is a partially sectioned perspective view of the trailer in the carriage position.

In the preferred form of the present invention which relates to a trailer, a tray 10 is secured to a transverse axial member 12a supporting a pair of ground support wheels 12, and mounted so as to be slideably held within an elongate laterally disposed guide slot 15 of a chassis 11, and so that a pivot 14 and the axial member 12a are disposed on a common line normal to the underside of the tray 10.

The chassis 11 typically comprises a drawbar with parent automobile attachment means, such as a towbar, at its 'front' end and the elongate guide slot 15 at its 'rear' end.

A roller forming the pivot 14 is accommodated within the guide slot 15, and adapted to be longitudinally displaceable from one end of the guide slot 15 to the other, and is mounted to the underside of the tray 10 by a pair of brackets 14a.

Two ground support wheels 12 are mounted on opposing distal ends of the axial member 12a and are adapted to rotate thereabout.

Preferably, two transversely mounted leaf springs 19 adapted to dampen vertical movement of the axle 12a, are secured one inwardly of each wheel 12, and have distal ends mounted to the underside of the tray 10 by bearing brackets 18.

Thus, the tray 10, leaf springs 19, axial member 12a and wheels 12 form a unit able to move independently of the drawbar forming the chassis 11 of the trailer, and it will be appreciated, that, in use, the tray 10, leaf springs 19, axial member 12a and wheels 12 may all be translated both forwards and rearwards with respect to the chassis 11 (i.e., about the pivot 14 within the guide slot 15) and may articululate about the pivot 14 so as to alter the angular disposition of the tray 10 between carriage and discharge positions.

Forward of the guide slot 15, the chassis incorporates a transverse roller extending either side of the centre line of the chassis 11. This transverse roller is a roller forming a cam-follower 17.

Mounted on a corresponding position on the underside of the tray 10, there is further provided two ramps forming inclined cams 20, adapted to co-act with the cam-follower 17 to control the rate and angle of the tilting of the tray 10 between the carriage and discharge positions.

In a carriage position, the tray 10 is in a substantially parallel relationship with the chassis 11, and the cam-follower 17 is disposed at a beginning of the inclined cam 20.

In the preferred form of the invention the cams 20 have curved profiles, however in alternative embodiments, where it is desired to vary the angle and rate at which the tray 10 tips, they may be simply linear inclines or arcuate or even polygonal curves.

In use, as the tray 10 and attached ground support wheels 12 are slid rearwards relative to the chassis 11, the cams 20 simultaneously bear against the cam-follower 17 to raise the forward part of the tray 10 to the discharge position.

A closed end at the rear of the guide slot 15 restrains the rearward part of the tray 10 against rising so that the tray 10 can be tilted backwards about the rearward closed end of the guide slot 15 and pivot 14, enabling material carried upon the tray 10 to be discharged therefrom.

To return the tray 10 to its carriage position, the tray 10 and wheels 12 are slid forward with respect to the chassis 11, and accordingly the pivot 14 slides forward within the guide slot 15.

The cams 20 simultaneously bear against the cam-follower 17 to lower the forward part of the tray 10.

In a preferred form of the invention, the tray 10 may be provided, proud of a lower rear end thereof, with at least one suitable ground contact buffer 28, such as a skid, wheel, or roller. Provision of the ground contact buffer(s) 28 would prevent undue damage to that lower rear end which may occur when the tray 10 is disposed in the discharge position.

In the preferred form of the invention, the tray 10 is further provided with a latchable element 22 mounted on the forward end thereof and securable to an associated section of the chassis 11 by suitable locking means 23, such as a pin. Preferably the pin is securably disposable within an aperture provided within that associated section of the chassis 11.

It will be appreciated that the operation of the latch may be manually or remotely controlled and that while in the engaged mode, movement of the tray 10 relative to the chassis 11 is prevented.

Typically the latch would be engaged while the trailer is being towed by a parent automobile.

In practice, when it is desired to tip the tray 10, the latch securing the tray 10 to the chassis 11 is disengaged.

The parent automobile and attached trailer are then driven backwards for a short distance, until the operator of the parent automobile suddenly applies the brakes of that vehicle.

The parent automobile and chassis 11 of the trailer stop, but the tray 10 and its attached axial member 12a supporting ground support wheels 12 continue to move rearward as a result of their own inertia.

Thus, the sequence of events described above takes place, and the tray 10 tilts backwards to its discharge position at an angle and rate controlled by the action of the cams 20 and cam-follower 17.

Once the trailer's load has been discharged, it is a relatively simple matter to push the tray 10 and wheels 12 forward again so that the tray 10 returns to its lowered, carriage position.

Alternatively, this lowering can be achieved by driving forward the parent automobile with trailer attached and then suddenly applying the brakes of the parent automobile.

The latch is then engaged, and the tray 10 is ready to carry its next load.

Various modifications may be made to the above without departing from the invention as broadly defined or envisaged.

For example, the cams 20 may be secured to the chassis 11 and the cam-follower 17 to the tray 10. Similarly, the guide slot 15 may be mounted on the underside of the tray 10, and the pivot 14 to the chassis 11.

Instead of two cams 20 and one transverse cam follower 17, there may be any appropriate number of them, located and arranged in any suitable manner. Furthermore, there could be any appropriate number and arrangements of guide slots 15 and pivots 14. In place of the elongate guide slot 15, any other suitable guiding means could be used.

The cam follower 17 and pivot 14 need not necessarily be rollers. Slide blocks or any other low friction devices may be used.

The tray 10 may also be bounded on all but the rear of its edges by material retaining means such as walls 10a, and incorporate, at its rear edge, a removeable or articulated tailgate 29, so that material being discharged from the tray 10 will not be impeded during the tilting thereof.

Finally, it will be appreciated that further alterations, additions and modifications may be made to the foregoing without departing from the scope of the invention as defined in the following claims.

I claim:

1. A wheeled vehicle with front latching means comprising a chassis incorporating a tow bar at a front end; a tipping tray secured to at least one axial member supporting ground wheels; articulation means comprising a pivot with a transversely disposed axis, secured to the tray; guiding means secured to the chassis and adapted to slidably accommodate for longitudinal displacement said articulation means; camming means longitudinally spaced apart from the articulation means and comprising at least one cam and one cam follower, the cam being secured to the tray and the cam follower being secured to the chassis and adapted to cooperate to alter the angular disposition of the tray between a carriage position and a discharge position when a sudden change in the vehicle's inertia causes a net rearward force on the tipping tray causing the pivot to be moved longitudinally of the guiding means in so doing the camming action of the camming means articulating the tray about the axis of the pivot, whilst latching means adapted to maintain the disposition of the chassis and tray relative to one another are disengaged, and wherein, in the carriage position, the tray is in a substantially parallel relationship with the chassis, and the cam follower is disposed at the beginning of the cam.

2. A vehicle as claimed in claim 1, wherein the guiding means comprise a laterally opening slot formed within and extending from a rear and closed end of the chassis, and wherein the pivot comprises a roller mounted to an underside of the tray to locate within the slot.

3. A vehicle as claimed in claim 2, wherein said cam is inclined and is mounted to the underside of the tray, forward of the pivot, and wherein the cam-follower comprises a transversely mounted roller fixed to the chassis forward of the slot.

4. A vehicle as claimed in claim 3, wherein the pivot and axial member are disposed, on a common line normal to the underside of the tray.

5. A vehicle as claimed in claim 4, wherein the latching means comprises a latchable element disposed at a front edge of the tray and a pin securable within an aperture provided within an associated section of the chassis, this arrangement adapted to maintain the substantially parallel carriage disposition of the chassis and tray relative to one another.

6. A vehicle having a front end and a rear end and two wheels located on either side thereof and comprising:
   a tipping tray;
   a generally straight chassis connected between said wheels for carrying said tipping tray, said chassis defining a longitudinal opening near the rearward end of the chassis, said opening being parallel to said chassis; and
   articulation means having an axis normal to said chassis and connected to said tipping tray, said articulation means being slidably received within said longitudinal opening in said chassis such that during relative movement between said tipping tray and said chassis wherein these is application of a net rearward force on said tipping tray said articulation means moves rearwardly in said longitudinal opening and parallel to said chassis until said tipping tray pivots about the axis of said articulation means.

7. A vehicle having a front end, a rear end and two wheels located on either side thereof and comprising:
   a tipping tray;
   a generally straight chassis connected between said wheels for carrying said tipping tray, said chassis defining therein a longitudinal opening near the rear end of the chassis, said opening being parallel to said chassis, said longitudinal opening and said rear end of said chassis lying between said wheels; and
   articulation means having an axis normal to said chassis and connected to said tipping tray, said articulation means being slidably received within said longitudinal opening in said chassis such that during relative movement between said tipping tray and said chassis such that a net rearward force acts on said tipping tray, said articulation means slides in said opening parallel to said chassis.

8. The vehicle of claim 7 wherein said chassis is comprised of a single bar.

9. A vehicle having a front end and a rear end and two wheels located on either side thereof and comprising:
- a tipping tray;
- a generally straight chassis connected between said wheels for carrying said tipping tray, said chassis defining a longitudinal opening near the rearward end of the chassis, said opening being parallel to said chassis;
- articulation means having an axis normal to said chassis and connected to said tipping tray, said articulation means being slidable received within said longitudinal opening in said chassis such that during relative movement between said tipping tray and said chassis said articulation means slides in said opening parallel to said chassis;
- a generally inclined cam attached to said tray and located forwardly of said articulation means; and
- a cam follower attached to said chassis, said generally inclined cam and said cam follower being interrelated such that as said articulation means slides rearwardly in said opening, said generally inclined cam follower is pulled over said cam causing said tipping tray to pivot about said axis of said articulation means such that said front end of said tray moves upwardly away from said chassis as said back end of said tray tips downwardly behind said chassis and toward said wheels.

10. The vehicle of claim 9 wherein said chassis is comprised of a single bar.

* * * * *